F. H. TREAT.
FLEXIBLE COUPLING FOR SHAFTS.
APPLICATION FILED JUNE 1, 1908.
999,917.
Patented Aug. 8, 1911.
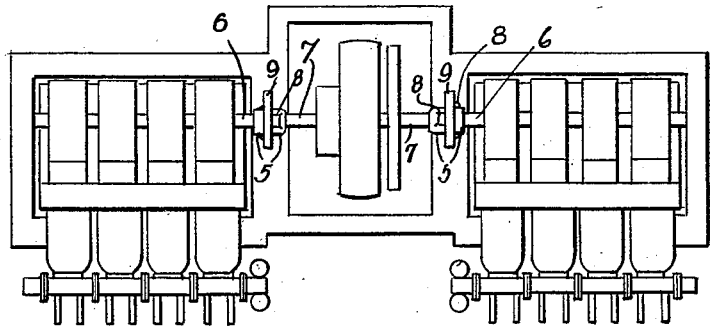
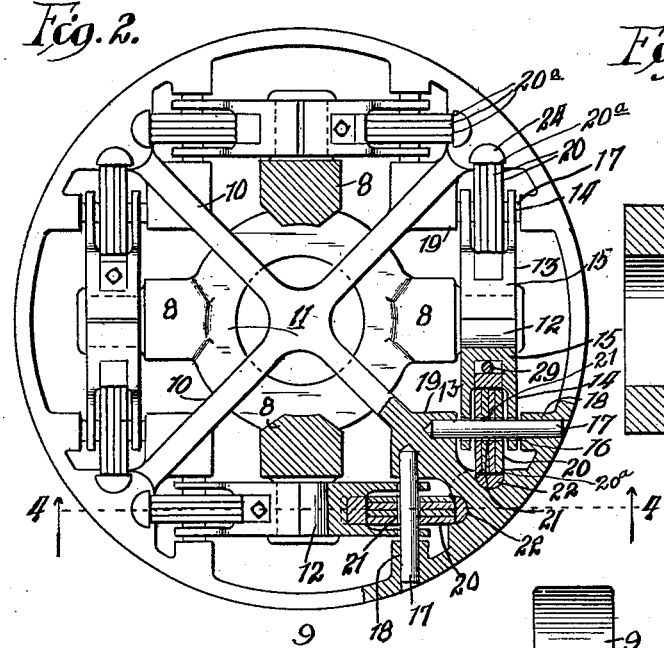
Witnesses:
Inventor:
Francis H. Treat
By Banning & Banning
Attys.

UNITED STATES PATENT OFFICE.

FRANCIS H. TREAT, OF CLEVELAND, OHIO.

FLEXIBLE COUPLING FOR SHAFTS.

999,917.  Specification of Letters Patent.  Patented Aug. 8, 1911.

Application filed June 1, 1908. Serial No. 436,062.

*To all whom it may concern:*

Be it known that I, FRANCIS H. TREAT, a citizen of the United States, residing at Cleveland, in the county of Cuyahoga and State of Ohio, have invented certain new and useful Improvements in Flexible Couplings for Shafts, of which the following is a specification.

The coupling of the present invention is intended primarily for application to shafting where individual sections thereof are mounted in independent bearings which rigidly control their position and direction. Through inaccuracies of construction and variation in the nature of the service to which the different sections of shafting are subjected, which cause unequal wearing of the bearings, errors in alinement of a serious nature are of common occurrence, and this is especially true in machinery which is required to withstand severe service. In these circumstances, unless a coupling is employed which will permit each section to lie naturally in the position determined by its bearings, serious straining thereof and breakage is liable to occur.

The object of the present invention is to provide a coupling which will secure complete rigidity as regards the transmission of rotative effort, or torsional stress, presenting a solidity of structure and freedom from lost motion when revolved in either direction or suddenly reversed as complete as is possessed by the shaft itself. At the same time the coupling provides a practically frictionless lateral mobility within stated limits which is intended to compensate for a lateral displacement of the two shaft sections as is the case when they are offset or thrown out of alinement while maintaining axial parallelism. The coupling also serves to compensate a bending action as where the two shaft sections are out of parallelism and do not lie in the same direction.

The coupling is of especial utility in providing a connection between the crank and flywheel sections of multi-cylinder gas engines, the crank section having a number of cranks therein, and being mounted in several bearings is very rigidly held to resist the excessive thrust from the cylinders and pistons, so that if the cylinders are arranged horizontally the bearings will be chiefly worn in that direction while the flywheel section, mounted upon two bearings, will be rigidly held by the great weight of the flywheel as well as the heavy rotating parts of electric generators, so that the bearings will be worn in a vertical direction. In these circumstances it is plain that the two shaft sections will, in time, acquire more or less of a displacement from their true positions with respect to one another. By the use of the present coupling the shafts can be safely operated when badly out of line without loss of power, thus rendering it possible to couple several shaft sections together so as to work a large number of cylinders upon a single line of shafting to form large engine units.

The invention consists in the features of construction and combination of parts hereinafter described and claimed.

In the drawings Figure 1 is a top or plan view of multi-cylinder gas engine generating sets embodying the coupling of the present invention; Fig. 2 a sectional elevation through the coupling showing the face of the intermediate member; Fig. 3 a cross sectional view of the intermediate member and hubs; Fig. 4 a sectional detail taken on line 4—4 of Fig. 2, looking in the direction of the arrow; and Fig. 5 an enlarged edge elevation of one of the toggle plates.

The coupling comprises a pair of companion hubs 5—5 adapted to receive the ends of an engine shaft 6, and a dynamo shaft 7 respectively in the particular embodiment of the invention shown in Fig. 1. The hubs are of cylindrical tubular formation, and each is provided on opposite sides with a pair of forwardly projecting arms 8—8 which extend radially from the opposite sides thereof. When the parts are assembled the arms of the companion hubs will occupy interlocking positions and lie in the same transverse plane with respect to one another. The arms coöperate with an intermediate member 9 which, in the present embodiment of the invention, is in the form of a spider ring provided with four spoke arms 10 connected at the center 11; and the spokes are positioned equidistant from one another and rest between the ends of the companion hubs and intermediate the oppositely disposed forwardly projecting arms thereon. Each of the hub arms is provided with an outwardly extending grooved trunnion 12 which affords a mounting for oppositely extending frames 13, two of such frames being shown in section in Fig. 2. Each of the frames is of yoke shape comprising side arms 14 and a connecting cross head 15, which latter is inwardly rounded at its inner end to receive the rounded wall of the trunnions 12. Each of the yoke arms 14 is provided with a hole 16 through which is entered a pin 17 the outer end of which is entered within a socket 18 on the inner wall of the surrounding ring. The opposite end of the pin 17 is entered within a recessed lug 19 on the side of the adjacent spoke of the intermediate member.

In view of the fact that there are four pairs of frames connected with the intermediate member, it is apparent that the frames will be arranged in a square formation, and that the adjacent pins 17 will be set at right angles to each other through the corners of the square as indicated in Fig. 2. It further appears that the spoke arms of the intermediate member will extend diagonally with respect to the square. The spokes afford the only active part of the intermediate member, the circular or ring shaped portion serving as a guard and reinforcement of the spokes, and to provide a smooth exterior casing. Each of the frames affords a mounting for a plurality of elongated rocking plates 20 of rectangular shape, the end edges 20$^a$ of which plates, as shown in Fig. 5, are rounded with respect to the flat faces of the plates, which arrangement permits the plates to rock on their edges as a bearing. The edges of each plate are preferably ground on the arc of a circle of which the length of the plate represents the diameter, thereby enabling the plate to serve as an anti-friction roller or rocker. In the construction shown four plates are carried by each of the yokes, and each of the plates is provided with a hole 21, which holes register with the holes 16 in the yoke arms all the holes being of slightly larger diameter than the diameter of the pins 17, so that a certain amount of clearance will be afforded. The ends of the plates bear against a half-cylindrical bearing block 22 within a recess 23, into the mouth of which recess the ends of the plates 20 are entered. The ends of the bearing blocks 23 are provided with half circular flanges 24, which prevent endwise displacement. As shown in Fig. 4, the inside 25 of the head 15 of the yoke frame is inwardly beveled in opposite directions intermediate the side walls, which beveled faces coöperate with a doubly beveled inner bearing block 26, which lies intermediate the side arms of the yoke and overlies the adjacent ends of the four toggle plates 20. Intermediate the beveled surfaces are entered a pair of oppositely disposed wedges 27 which have a connecting bolt 28 entered therethrough, on the end of which bolt is located a nut 29, the arrangement being one whereby the plates can be held tightly against the flat surface of the bearing block 22.

When the driving and driven shafts are in true alinement the rotative effort or torsional stress will be applied by the arms of the driving hub and imparted therefrom through the plates to the intermediate member in the direction of the drive. This effort, being longitudinally of the plates, will maintain the latter at right angle relation to the driving trunnions and the parts will be held with sufficient rigidity to prevent any lost motion in the direction of the drive. The same is true of the plates which receive their impetus from the intermediate member and transmit it to the trunnions of the driven hub, which arrangement gives complete rigidity as regards the driving action of the mechanism, either in normal or in reverse direction. If, however, the shafts are out of alinement by reason of original or acquired imperfections in the bearings, the driving and driven hubs will be thrown out of register to a greater or less degree with the consequence that the plates will be swung to a slightly oblique position with respect to the normal, causing the plates of the same set to move endwise with respect to one another. When this condition obtains the plates will act as anti-friction rollers or rockers, each one swinging individually on its rounded end as an axis, whereby the coupling will accommodate imperfections in alinement of the driving and driven shafts without loss of rotative effort and without appreciable friction.

The trunnions serve to compensate for any bending action as where the shaft sections are inclined with respect to one another, in which case the curved ends of the yokes which engage the trunnions will permit of variations from normal due to such inclination. The bearing edges of the plates being truly ground and bearing upon truly flat and paralleled surfaces, they will roll thereon when rocked or tilted with the greatest freedom, no matter how tightly they are pressed together, and as they are practically frictionless, when once adjusted by the action of the wedges will remain permanently in condition. The purpose in having a number of plates is to distribute the pressure upon a greater length of contact than could be obtained with a single plate similarly mounted. The semi-cylindrical bearing blocks 22 are automatically self-adjusting to conform to the general surface of the ends of the plates pressing upon them, the opposite blocks 26 being also self-adjusting with reference to an axis at right angles to that of the bearing blocks 22 through the agency of the trunnions 12. This arrangement causes the blocks to at once adjust themselves to a perfect contact with both ends of the plates regardless of the size of the latter or the number used.

What I claim as new and desire to secure by Letters Patent is:

1. A coupling, comprising a driving member and a driven member, arms on each of the members positioned intermediate one another, a spider interposed between the two members and having its arms intermediate the driving and driven arms, a rocking connection between each of said driving and driven arms and the spider arms, said connection comprising a yoke connected with the adjacent arm, and a plurality of rocking plates mounted within the yoke and engaging the spider arms and movable endwise with respect to one another, substantially as described.

2. A coupling, comprising a driving member and a driven member, two arms on each of the members positioned alternating one another, an intermediate member interposed between the two members and having arms intermediate the driving and driven arms, connections between the intermediate member and each of the arms of the driving and driven members, said connections comprising yokes connected with the adjacent arms of the driving and driven members, a plurality of rocking plates mounted within each yoke and engaging the intermediate member and movable endwise with respect to one another, and self-adjusting bearing blocks pivoted to rock within the intermediate member against which the ends of the rocking plates bear, substantially as described.

3. A coupling, comprising a driving member and a driven member, arms on each of the members positioned intermediate one another, an intermediate member interposed between the two members and having spokes intermediate the arms, a connection between each of the arms and the intermediate member, said connection comprising a yoke engaging the adjacent arm, a plurality of rocking plates mounted within the yoke and engaging the intermediate member and movable endwise with respect to one another, a self-adjusting bearing block pivoted to rock within the intermediate member against which the ends of the plates bear, and wedge blocks within the yokes bearing against the opposite ends of the plates, substantially as described.

4. A coupling, comprising a driving member and a driven member, arms on each of the members positioned to alternate one another, an intermediate member interposed between the two members and having its arms intermediate the driving and driven arms, a connection between each of the driving and driven arms and the intermediate member, said connection comprising a yoke connected with the adjacent arm, a plurality of rocking plates mounted within the yoke and engaging the intermediate member and movable endwise with respect to one another, a bearing block within the intermediate member against which the ends of the plates bear, a bearing block within the yokes bearing against the opposite ends of the plates, and pins entered through the yokes and the plates mounted therein, said plates being retained by said pins, substantially as described.

5. In a coupling, the combination of two hubs, each provided with a plurality of inwardly extending arms positioned to alternate one another, an intermediate member having arms entered between the first mentioned arms, trunnions on the first mentioned arms, a pair of oppositely disposed yokes engaging each of the trunnions, and rocker plates carried by the yokes and having their outer ends in engagement with the intermediate member and movable endwise with respect to one another, substantially as described.

6. In a coupling, the combination of two hubs, each provided with a plurality of inwardly extending arms positioned to alternate one another, a spider comprising a ring having spokes entered between the arms, trunnions on the arms, a pair of oppositely disposed yokes engaging each of the trunnions, plates carried by the yokes, and a rounded self-adjusting bearing block for each set of plates, socketed within the spider, against which the outer ends of the plates bear, substantially as described.

7. In a coupling, the combination of two hubs, each provided with a plurality of inwardly extending arms positioned alternate one another, an intermediate member having arms entered between the first mentioned arms, trunnions on the first mentioned arms, a pair of oppositely disposed yokes engaging each of the trunnions, rocker plates carried by the yokes, bearing blocks for said plates mounted in said yokes, bearing blocks within the intermediate member against which the other ends of the plates bear, and wedge blocks for adjusting one set of said bearing blocks, substantially as described.

8. In a coupling, the combination of two hubs, each provided with a plurality of inwardly extending arms positioned alternate one another, a spider comprising a ring having spokes entered between the arms, trunnions on the arms, a pair of oppositely disposed yokes engaging each of the trunnions, plates carried by the yokes, a bearing block for each set of plates carried by the intermediate member against which the outer ends of the plates bear, and pins entered through the yokes and the plates mounted therein, substantially as described.

FRANCIS H. TREAT.

Witnesses:
P. J. WARDNER,
JOHN M. GEHRUNG.